(12) United States Patent
Candelore

(10) Patent No.: US 11,375,260 B2
(45) Date of Patent: Jun. 28, 2022

(54) SCREEN SAVER BASED MESSAGING

(71) Applicant: Sony Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 60 days.

(21) Appl. No.: 16/599,659

(22) Filed: Oct. 11, 2019

(65) Prior Publication Data

US 2021/0112218 A1   Apr. 15, 2021

(51) Int. Cl.
*H04N 21/422* (2011.01)
*H04N 21/488* (2011.01)
*H04N 21/431* (2011.01)

(52) U.S. Cl.
CPC ... *H04N 21/42204* (2013.01); *H04N 21/4312* (2013.01); *H04N 21/4882* (2013.01); *H04N 21/4221* (2013.01); *H04N 21/42209* (2013.01)

(58) Field of Classification Search
CPC ............. H04N 5/4403; H04N 21/4312; H04N 21/4882; H04N 2005/441; H04N 2005/4412; H04N 21/42204; H04N 21/4221; H04N 21/42209; H04N 21/44016; H04N 21/4316; H04N 21/4333; H04N 21/4424; H04N 21/812
See application file for complete search history.

(56) References Cited

U.S. PATENT DOCUMENTS

| 8,555,326 | B2 | 10/2013 | Candelore | |
| 2002/0104082 | A1* | 8/2002 | Fries | H04N 7/0884 725/32 |
| 2009/0249322 | A1* | 10/2009 | Sugiyama | G06F 8/65 717/173 |
| 2009/0282372 | A1* | 11/2009 | Jerding | H04N 5/44543 715/867 |

FOREIGN PATENT DOCUMENTS

CN    105847981 A    9/2019

* cited by examiner

*Primary Examiner* — Michael E Teitelbaum
(74) *Attorney, Agent, or Firm* — Trellis IP Law Group, PC

(57) ABSTRACT

Implementations generally relate to a message system. In some implementations, a method includes detecting activation of a screen saver that is displayed on a user interface associated with a television platform. The method further includes determining one or more messages to be displayed on the user interface in response to the detecting of the activation of the screen saver. The method further includes displaying the one or more messages on the user interface based on one or more predetermined policies. The method further includes removing the one or more messages from the user interface based on the one or more predetermined policies.

20 Claims, 5 Drawing Sheets

SCREEN SAVER BASED MESSAGING

BACKGROUND

Many television platforms such as standalone smart-televisions, set-top boxes from cable, satellite or telco operators, and HDMI modules may utilize tablets and mobile devices for selecting and viewing media content such as movies and television shows. Such platforms display a user interface with icons of menus, features, services, and applications. Users are often not aware of television features and applications, because users typically do not read operation manuals or watch built-in guides or videos. Users also dislike listening to traditional advertising, which can be obtrusive. Adding an icon of a promotion program with other icons in a user interface generally has limited effect, because an icon might not be easy to find. Also, users may be hesitant to click on promotion icons.

SUMMARY

Implementations generally relate to a message system. In some implementations, a system includes one or more processors, and includes logic encoded in one or more non-transitory computer-readable storage media for execution by the one or more processors. When executed, the logic is operable to cause the one or more processors to perform operations including: detecting activation of a screen saver that is displayed on a user interface associated with a television platform; determining one or more messages to be displayed on the user interface in response to the detecting of the activation of the screen saver; displaying the one or more messages on the user interface based on one or more predetermined policies; and removing the one or more messages from the user interface based on the one or more predetermined policies.

With further regard to the system, in some implementations, the one or more messages include an announcement of one of a new feature or information for an existing feature. In some implementations, the one or more messages includes an advertisement for at least one of a service or a show. In some implementations, the one or more messages include one or more of text, audio, and video. In some implementations, at least one predetermined policy of the one or more predetermined policies includes displaying the one or more messages for a predetermined time period. In some implementations, at least one predetermined policy of the one or more predetermined policies includes removing the one or more messages in response to the screen saver being deactivated. In some implementations, at least one predetermined policy of the one or more predetermined policies includes removing the one or more messages in response to a selection of a remote control button associated with the television platform.

In some embodiments, a non-transitory computer-readable storage medium with program instructions thereon is provided. When executed by one or more processors, the instructions are operable to cause the one or more processors to perform operations including: detecting activation of a screen saver that is displayed on a user interface associated with a television platform; determining one or more messages to be displayed on the user interface in response to the detecting of the activation of the screen saver; displaying the one or more messages on the user interface based on one or more predetermined policies; and removing the one or more messages from the user interface based on the one or more predetermined policies.

With further regard to the computer-readable storage medium, in some implementations, the one or more messages include an announcement of one of a new feature or information for an existing feature. In some implementations, the one or more messages includes an advertisement for at least one of a service or a show. In some implementations, the one or more messages include one or more of text, audio, and video. In some implementations, at least one predetermined policy of the one or more predetermined policies includes displaying the one or more messages for a predetermined time period. In some implementations, at least one predetermined policy of the one or more predetermined policies includes removing the one or more messages in response to the screen saver being deactivated. In some implementations, at least one predetermined policy of the one or more predetermined policies includes removing the one or more messages in response to a selection of a remote control button associated with the television platform.

In some implementations, a method includes: detecting activation of a screen saver that is displayed on a user interface associated with a television platform; determining one or more messages to be displayed on the user interface in response to the detecting of the activation of the screen saver; displaying the one or more messages on the user interface based on one or more predetermined policies; and removing the one or more messages from the user interface based on the one or more predetermined policies.

With further regard to the method, in some implementations, the one or more messages include an announcement of one of a new feature or information for an existing feature. In some implementations, the one or more messages includes an advertisement for at least one of a service or a show. In some implementations, the one or more messages include one or more of text, audio, and video. In some implementations, at least one predetermined policy of the one or more predetermined policies includes displaying the one or more messages for a predetermined time period. In some implementations, at least one predetermined policy of the one or more predetermined policies includes removing the one or more messages in response to the screen saver being deactivated.

A further understanding of the nature and the advantages of particular implementations disclosed herein may be realized by reference of the remaining portions of the specification and the attached drawings.

DETAILED DESCRIPTION

Implementations described herein relate to a screen saver based message system. As described in more detail herein, implementations enable a user to learn about aspects, features, and products associated with his or her television platform. Implementations provide an innocuous message system that does not require the user to specifically activate it, and that is triggered in such a way as to not annoy the user. The messages may consist of graphics, text, audio, and video, or a combination thereof. As described in detail herein, the television platform may be a standalone television, but may also be a set-top from a cable, satellite or telco service provider, depending on the particular implementation. The television platform may also be an over-the-top (OTT) device that aggregates Internet content that connects to the television over HDMI. The television platform itself may also receive OTT Internet content. All such devices may be deemed equivalent. Messages are presented to the user in a subtle and non-obtrusive way.

As described in more detail herein, in various implementations, a system detects activation of a screen saver that is displayed on a user interface associated with a television platform. The system then determines one or more messages to be displayed on the user interface in response to the detecting of the activation of the screen saver. Such messages may include, for example, messages alerting the user to new and existing features of the TV platform, promotional programs, streaming services, etc. The system then displays the one or more messages on the user interface based on one or more predetermined policies. The system removes the one or more messages from the user interface based on the one or more predetermined policies.

Figure 1:
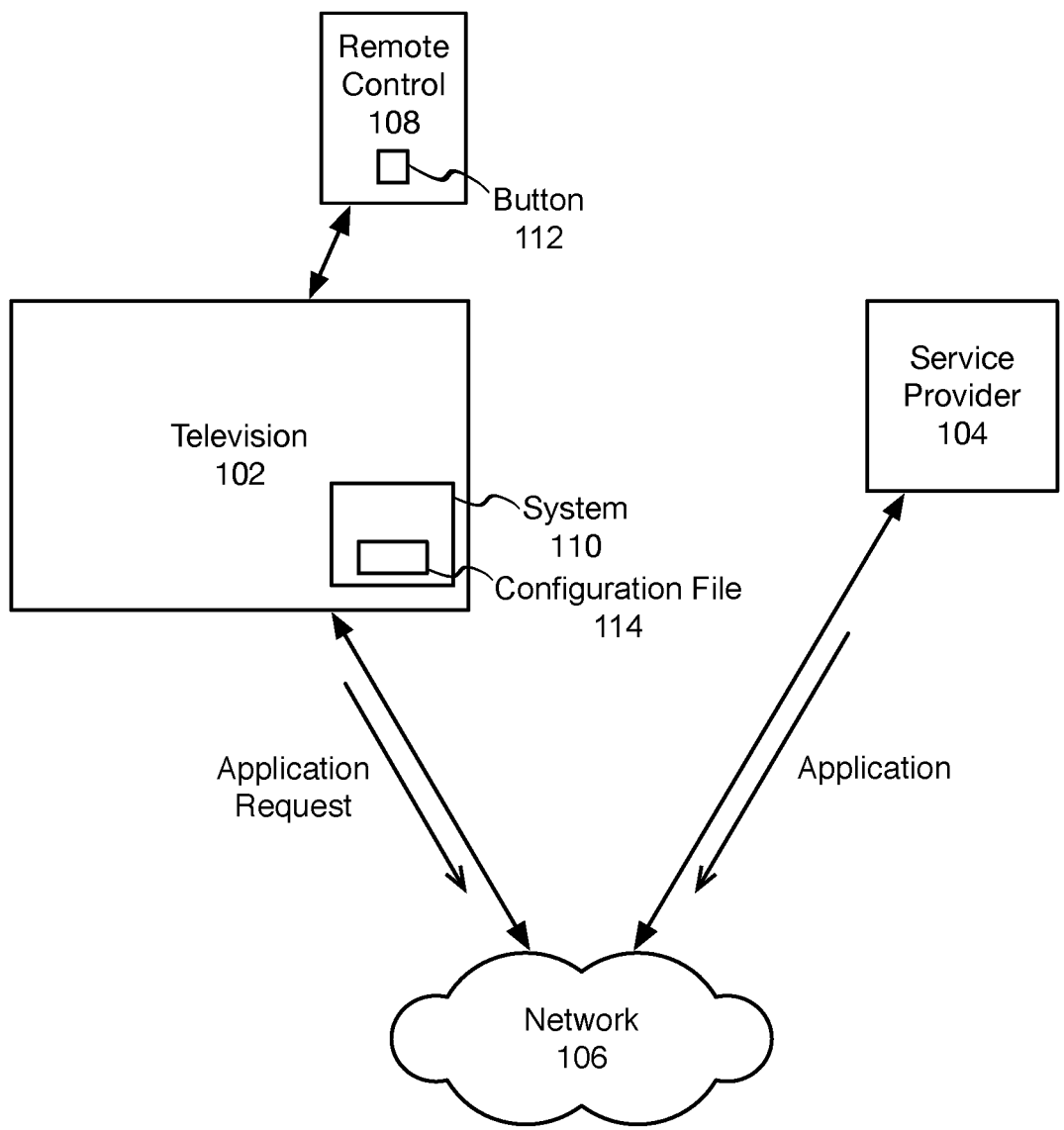
FIG. 1 illustrates a block diagram of an example media environment, which may be used for some implementations described herein.

FIG. 1 illustrates a block diagram of an example media environment 100, which may be used for some implementations described herein. In some implementations, media environment 100 includes a television platform, e.g., standalone television 102 and a service provider 104, which may communicate with each other via a network 106. In some implementations, the network may be the Internet. In some implementations, the network may include any combination of networks such as the Internet, a wide area network (WAN), a local area network (LAN), a Wi-Fi network, a Bluetooth network, near-field communication (NFC) network, cable network, Advanced Television Systems Committee (ATSC) 3.0 broadcast/broadband network, etc.

In various embodiments, system 110 of television 102 may be connected to one or more set-top boxes for linear programming (e.g., cable, satellite, and Internet Protocol television, etc.). System 110 of television 102 may also be connected to smart adapter devices such as FireTV™, Apple TV™, ROKU™, Chrome TV™, or smart Blu-Ray™ disc players. System 110 of television 102 may also be connected to video game consoles such as Nintendo™, PlayStation™, Xbox™, etc. In various implementations, system 110 of television 102 decodes content delivered by over-the-top (OTT) applications such as Netflix™, Amazon Video™, Hulu™, Crackle™, etc.

In various implementations, a user may use a remote control 108 to communicate with a system 110 associated with television 102. The terms remote control, remote control device, and remote may be used interchangeably. Remote control 108 includes various control buttons such as button 112. For ease of illustration, one button 112 is shown. There may be any number of control buttons on remote control 108. The remote control 108 is shown in this particular example. In other embodiments, there may be an on-screen menu of icons selected by highlighting and selecting, or on-screen menu of icons that are selected via a touch-screen interface.

In various implementations, system 110 may provide messages such as promotional messages alerting the user to an aspect of television 102 such as existing features or new features, an announcement of a new feature of the television platform (e.g., a new way to access applications or to navigate the settings menu). Such features enable the user to access a variety of media features, services, and products provided by system 110. A message may include information (e.g., a tip) for an existing feature (e.g., "Did you know that the Action Menu brings up a list of recently accessed programs?"). A message may include an advertisement for a service that the television platform can tune or deliver. As described in more detail herein, the system may display a message based at least in part on a button selection count based at least in part on predetermined time intervals. Such policies make messages less annoying and less objectionable. In other words, when a button is selected by the user, the television platform executes the operation associated with the button. The system may also implement some messaging depending on the button selection count or time interval between messages. For example, a promotional message may be delivered while the underlying function of the button is executed. This makes the messaging more tolerable to the user, because it does not occur with each and every selection of the button. For instance, if a user selects the home button for the seventh time, and as the icons are populated on screen, the system may present an audio message saying, "Check-out the Sony Privileged 4K service and get free 4K movies," for example. The count or time interval would then reset. If the user then selects the home button an eighth time, then only the home function would execute.

In various implementations, system 110 may communicate with service provider 104 on behalf of television 102 in order to provide messages alerting the user to promotion programs, streaming services, etc. provided by service provider 104. Messages may also include television programs, television features, applications, and any other information for configuring and operating television 102. In various implementations, the system announces a variety of messages that are reconfigurable by a configuration file such as configuration file 114, which is accessible by system 110. For example, the text message or the audio generated from a text-to-speech engine may be delivered via a configuration file. Alternatively, in some implementations, the configuration file may provide uniform resource locators (URLs) to a video.

In some implementations, system 110 may be integrated with television 102, and may control television 102. In some alternative implementations, system 110 may also be separate from television 102, e.g., in a set-top box or an HDMI dongle, and still control what gets displayed on the television 102. In some implementations, system 110 may be integrated with a computer system that is separate from television 102. In some implementations, system 110 may be integrated with a server device in the cloud.

As described in more detail herein, system 110 accesses configuration file 114 during an event (e.g., when a screen saver activation is detected, etc.). Configuration file 114 may include information associated with one or more messages to present to a user. For example, configuration file 114 may include a message associated with one or more features of television 102, a message associated with one or more particular applications, a message associated with one or more particular services, etc. For ease of illustration, one configuration file 114 is shown. The number of configuration files may vary, and will depend on the particular implementation.

Figure 2:
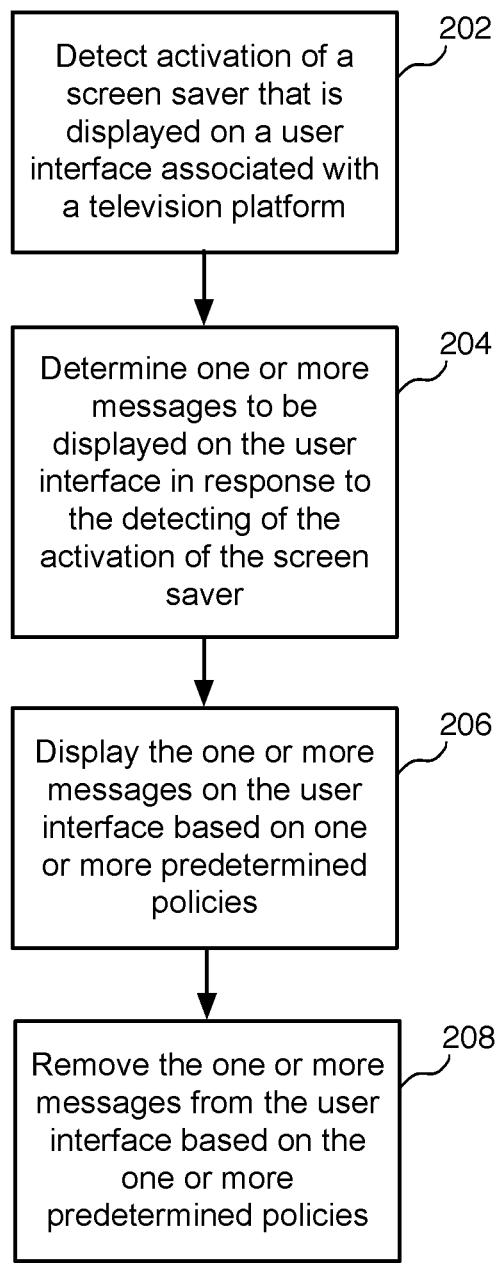
FIG. 2 is an example flow diagram for providing screen saver based messages on a television platform, according to some implementations.

FIG. 2 is an example flow diagram for providing screen saver based messages displayed by an OTT application running on a television platform or the television platform itself, according to some implementations. Referring to both FIGS. 1 and 2, a method is initiated at block 202, where a system, such as system 110 detects activation of a screen saver that is displayed on a user interface associated with a television platform. When a screensaver is activated, the screen of the user interface gets filled with images and/or abstract patterns, which helps the hardware of the TV screen to last longer. In general, the screensaver gets activated when television 102 is not in use for a particular period of time (e.g., 5 minutes, 10 minutes, 15 minutes, etc.).

In various implementations, system 110 may employ various different mechanisms for detecting if television 102 goes into a screen saver mode. For example, system 110 may monitor high-definition multimedia interface (HDMI) connections to detect if television 102 switches to a screen saver mode. In some implementations, system 110 may detect a toggle of a play/pause switch on a remote control device as a trigger for switching to screen saver mode.

In various implementations, system 110 may monitor an image buffer in order to detect changes between image frames. For example, if the image buffer is stationary for a period of time (e.g., 15 seconds, 30 seconds, etc.), system 110 may determine that the television 102 has switched to a screen saver mode. In some implementations, system 110 may determine that the television 102 is in screen saver mode if an attached device is paused or in screen saver mode. In some implementations, system 110 may determine that the television 102 is in screen saver mode if a streaming application running on the TV is in screen saver mode.

In some implementations, system 110 may determine that the television 102 is in screen saver mode if television 102 is tuned or has an input selected with no signal at all. For example, the source may have been turned-off while television 102 has been left on. In some implementations, system 110 may determine that the television 102 is in screen saver mode if the screen saver mode on one or more attached devices or OTT applications running on television 102 are in screen saver mode.

In some implementations, system 110 may determine that the television 102 is in screen saver mode if the screen of television 102 updates at particular time intervals (e.g., every 3, 5, 7, 10 minutes, etc.), if the screen is greatly darkened, if the screen is slightly darkened with an object that moves around the screen, if the screen is entirely paused, shifted around, or morphed, etc. For example, the source and television 102 may have been left on for a long enough period of time to trigger the screen saver. In various implementations, television 102 is a slave to the screen saver timing on an attached device and streaming applications running on the TV.

In some implementations, system 110 may determine that television 102 is in screen saver mode if the screen is frozen, if personal video recorder (PVR) content, a television guide or other type of menu is static for a certain amount of time, or if the screen is paused with content that appears static. For example, many people pause the set-top box PVR when they leave the room for various reasons (e.g., going to the kitchen, bathroom, etc.) Sometimes people are in the middle of doing something with the set-top box (e.g., looking at PVR contents or guide) before going on to something else. People often forget that the television has been left on. In some of these scenarios, the screen saver on the attached device or application for some reason may not have been activated when it normally would be activated.

In some implementations, the content that is in screen saver mode is not limited to content from HDMI. Content may also be from over-the-top (OTT) services, over-the-air (OTA) services, or on-screen-display (OSD) services generated by television 102 itself. For example, if the user presses the home screen button and walks away . . . then this will eventually cause the screen saver of television 102 to be activated.

In various implementations, for OTT services, television 102 is the device that is decoding the content, and the remote control is the device that used (and the device used with set-top box). System 110 may determine that the pause button is being pressed. In some scenarios, there may be a separate button to pause. As such, system 110 may treat the selection of the pause button as a toggle as in a pause/play toggle. Likewise, the play button can be treated the same way. In some implementations, system 110 may use the pressing of those buttons as a trigger into an extended screen saver mode for extended messaging.

In some implementations, system 110 may detect changes between frames being displayed on the screen. If nothing has changed, then a static image is on-screen. If the static image changes at relatively large intervals, then the source (e.g., HDMI input, OTT input, etc.) is in screen saver mode.

In some implementations, the system may monitor the content decompressed and rendered in the video buffer. This content may be obtained from HDMI or video inputs, or from an application that decodes the content on the television and drives the display.

In some implementations, the system may set flags to track image conditions (e.g., no signal, screen saver, frozen screen, etc.) over large periods of time (e.g., 3 minutes, 5 minutes, 10 minutes, 15 minutes, 20 minutes, etc.) For example, if the image changes every 3, 5, 10 minutes etc., the set-top box or application is in screen saver mode.

At block 204, the system determines one or more messages to be displayed on the user interface in response to the detecting of the activation of the screen saver.

In various implementations, the system provides a message on the television platform based on one or more predetermined policies. In various implementations, the system provides messages alerting the user to promotion programs, streaming services, etc. Messages may include announcements of one or more movies and/or television programs and/or applications. Messages may include announcements of one or more new television features or information for an existing feature and/or existing television features. Messages may include one or more tips associated with one or more new television features. Messages may include one or more tips associated with one or more existing television features. Messages may include other information for configuring and operating television 102. In various implementations, messages may include one or more advertisements. For example, in some implementations, a message may include an advertisement for one or more services. In some implementations, a message may include an advertisement for one or more shows. In various implementations, the message may include one or more of text, audio, and video.

In various implementations, the system may display opportunistic messaging that educates users about television functions, quick access buttons, services or applications that the television manufacturer may wish to promote, or different features of applications installed in the television. Messaging may also be used for alerting users about recent news events.

In various implementations, the messaging that the system delivers while in screen saver mode may alert the user about anything that might be relevant to the user (e.g., not limited to a promotion program or a service). For example, a message may alert the user to a new feature of the operating system after an update. The image displayed could also be a news event (e.g., a famous rock star passed away, local flooding, etc.).

In various implementations, when a screen saver mode or opportunity arises, the system may place advertising on the screen to promote television features and applications that a user might want to know about. In other words, promotional items could be placed on the screen.

For devices connected to the television, the image may be constantly driven through the HDMI or video input. If a picture changes every 5 minutes, the system may overwrite the video buffer with its own content for a predetermined period of time (e.g., 3 minutes, etc.), and then leave an amount of time (e.g., 1 minute) of the previous image that gets re-displayed. In some implementations, the first minute and the last minute of the content may match or be morphed from each other.

In some implementations, for streaming applications, the system may update the image. The image buffer may not get constantly refreshed. The system still detects a screen saver mode in a similar way as for attached devices.

In some implementations, messages may include messages for television functions such as the remote control (RC) microphone in order to use voice commands instead of buttons on the RC (or the action menu or discover buttons), quick access buttons on the remote control, services or applications to be promoted, or home screen ribbon of application icons.

At block 206, the system displays the one or more messages on the user interface based on one or more predetermined policies. For example, in some implementations, at least one predetermined policy of the one or more predetermined policies includes displaying the one or more messages for a predetermined time period.

In various implementations, the system may overwrite the display with its own television generated pictures instead of source device generated pictures. In some implementations, the system may overlay the screen saver with one or more messages. The messages may cover the entire screen or a portion of the screen (e.g., ¼ of screen).

In some implementations, the system may provide audible messages in addition to or in lieu of visual messages, which may be preferred by some users. The system may enable a user to reconfigure a given configuration to select a preference for visual messages, audible messages, or both. In some implementations, the system may enable a user to turn off the message feature.

At block 208, the system removes the one or more messages from the user interface based on the one or more predetermined policies. For example, in some implementations, at least one predetermined policy of the one or more predetermined policies includes removing the one or more messages in response to the screen saver being deactivated.

In some implementations, at least one predetermined policy may include removing the one or more messages after a predetermined time period (e.g., 15 seconds, 30 seconds, 1 minute, etc.)

In some implementations, at least one predetermined policy may include removing the one or more messages in response to a selection of a remote control button associated with the television platform. For example, the button may be an input button, a home button, an application button, etc. on a user interface of a remote control device such as remote control 108 or any other suitable device. In various implementations, the button may be an icon in a user interface menu navigated with a remote control or mouse. The button may also be an icon in a user interface menu on a touch screen interface such as on a personal computer, phone, or tablet. In some implementations, the button may be one of any number of buttons on a user interface, where the buttons are associated with multiple predetermined functions (e.g., home, launch application, channel up, channel down, volume up, volume down, etc.). Such predetermined functions may be reconfigurable. Other example functions are described in more detail herein.

Figure 3:
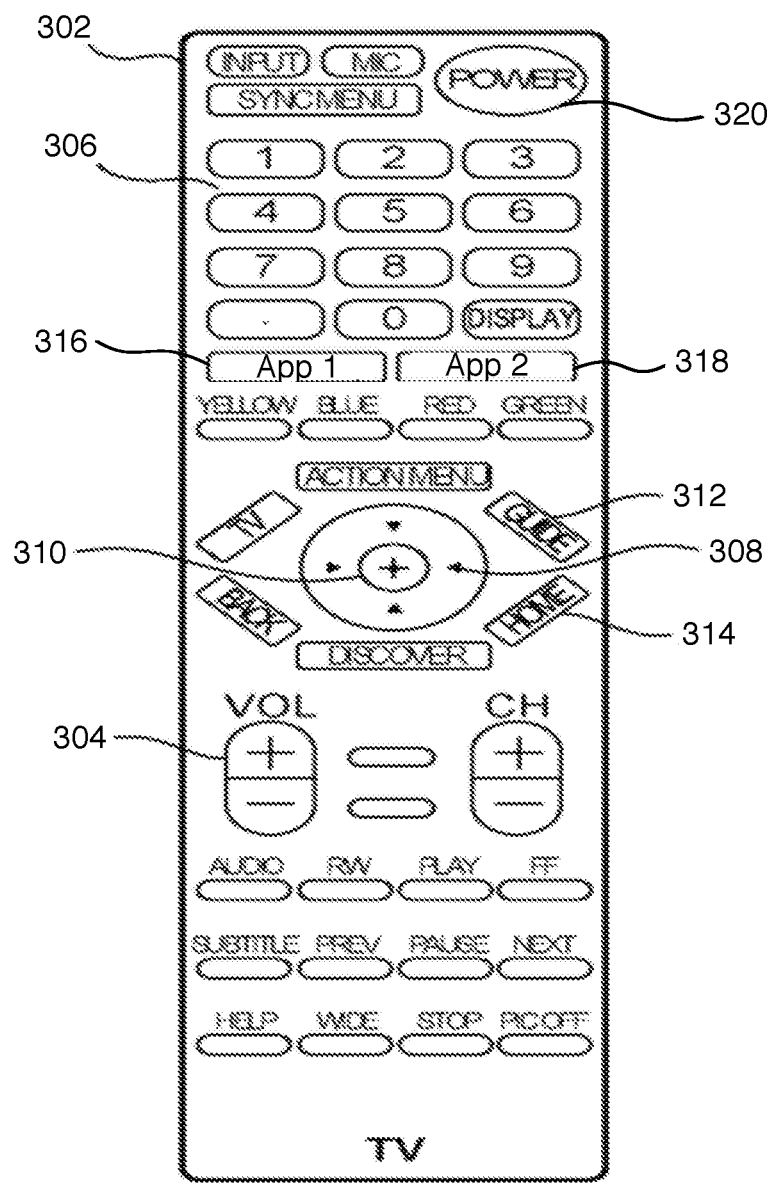
FIG. 3 is a block diagram of an example remote control device, according to some implementations.

FIG. 3 is a block diagram of an example remote control device 300, according to some implementations. Remote control device 300, also referred to as remote control 300, may be used to implement remote control 108 of FIG. 1.

As described in more detail herein, the system presents various messages when the system detects a selection of a particular button on the remote control device. Messages may include promotions to existing television features, promotions to new television features, services and products including applications, etc. In various implementations, some television features, some products, and some services may become available when associated software (e.g., television software, system software, operating system software, application software, etc.) is downloaded or updated.

In various implementations, remote control 300 may include one or more internal processors, computer memories, and wireless transmitters such as IR command transmitters to control a device such as television 102 of FIG. 1.

As shown, remote control 300 includes a typically plastic, hand-holdable housing 302 with multiple input keys that can be manipulated by a person to cause wireless commands to be sent from the remote control 300 to television 102 (e.g., to system 110). Volume up and down keys 304 may be manipulated to respectively turn the volume of the speakers of television 102 up and down. An alpha-numeric keypad 306 may be provided on remote control 300 for inputting letters and/or numbers to television 102. Also, a directional input element such as a rocker 308 or directional keys may be provided with each arm of the rocker being manipulable to move a screen cursor up and down and left and right. If desired, a select key 310 may be located in the center of the rocker 308 for input of a "select" command.

Further, in the example shown, remote control 300 may include a guide key 312 manipulable to send a command to present an electronic program guide (EPG) on television 102. Also, a home key 314 may be provided and can be manipulated to invoke a home menu. A special accessibility key may be provided. As shown, many other keys also may be provided, making the task for a blind person to learn the functions of the keys less daunting.

In various implementations, remote control 300 may include a changeable label on a button 316 (labeled App 1), for example, where the label is associated with a television feature or application. In other embodiments, the button label may be fixed. In various implementations, the system may provide changeable labels on multiple buttons such as button 318 (labeled App 2), for example. In some implementations, various labels are possible, depending on the particular implementation.

Implementations described herein provide various benefits. For example, implementations facilitate a user in being aware of offered features, services, and products associated with his or her television with minimal disruption to the user. Implementations convey information and promotional material to users that should be missed and yet conveys the information in a non-obtrusive way and without having the user take extra actions to receive a promotional message.

Figure 4:
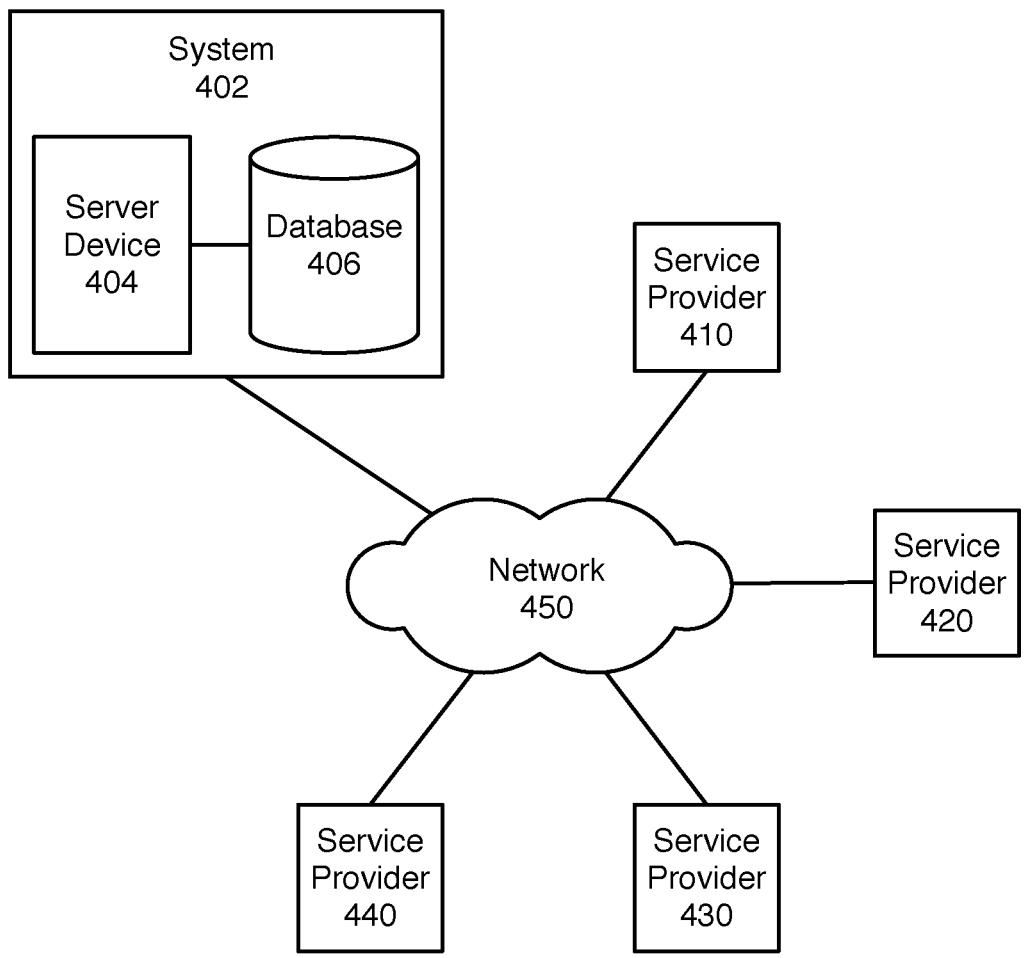
FIG. 4 is a block diagram of an example network environment, which may be used for some implementations described herein.

FIG. 4 is a block diagram of an example network environment 400, which may be used for implementations described herein. In some implementations, network environment 400 includes a system 402, which includes a server device 404 and a database 406. System 402 may be used to implement system 110 of FIG. 1.

Network environment 400 also includes service providers 410, 420, 430, and 440, which may communicate with system 402 and/or may communicate with each other directly or via system 402. Each service provider 410, 420, 430, and 440 is associated with one or more client devices. Network environment 400 also includes a network 450 through which system 402 and service providers 410, 420, 430, and 440 communicate. Network 450 may be any suitable communication network such as a Wi-Fi network, Bluetooth network, the Internet, etc. In various implementations, system 402 may be used to implement embodiments described herein.

For ease of illustration, FIG. 4 shows one block for each of system 402, server device 404, and database 406, and shows four blocks for service providers 410, 420, 430, and 440. Blocks 402, 404, and 406 may represent multiple systems, server devices, and databases. Also, there may be any number of client devices associated with any number of service providers. In other implementations, network environment 400 may not have all of the components shown and/or may have other elements including other types of elements instead of, or in addition to, those shown herein.

While server 404 of system 402 performs embodiments described herein, in other embodiments, any suitable component or combination of components associated with server device 404 or any suitable processor or processors associated with server device 404 may facilitate performing the embodiments described herein.

Implementations may apply to any network system and/or may apply locally for an individual system or device. For example, implementations described herein may be implemented by system 402 and/or any service providers 410, 420, 430, and 440. System 402 may perform the implementations described herein on a stand-alone computer, tablet computer, smartphone, etc. System 402 and/or any of service providers 410, 420, 430, and 440 may perform implementations described herein individually or in combination with other devices.

In the various implementations described herein, a processor of system 402 and/or a processor of any service providers 410, 420, 430, and 440 causes the elements described herein (e.g., information, etc.) to be displayed in a user interface on one or more display screens.

Figure 5:
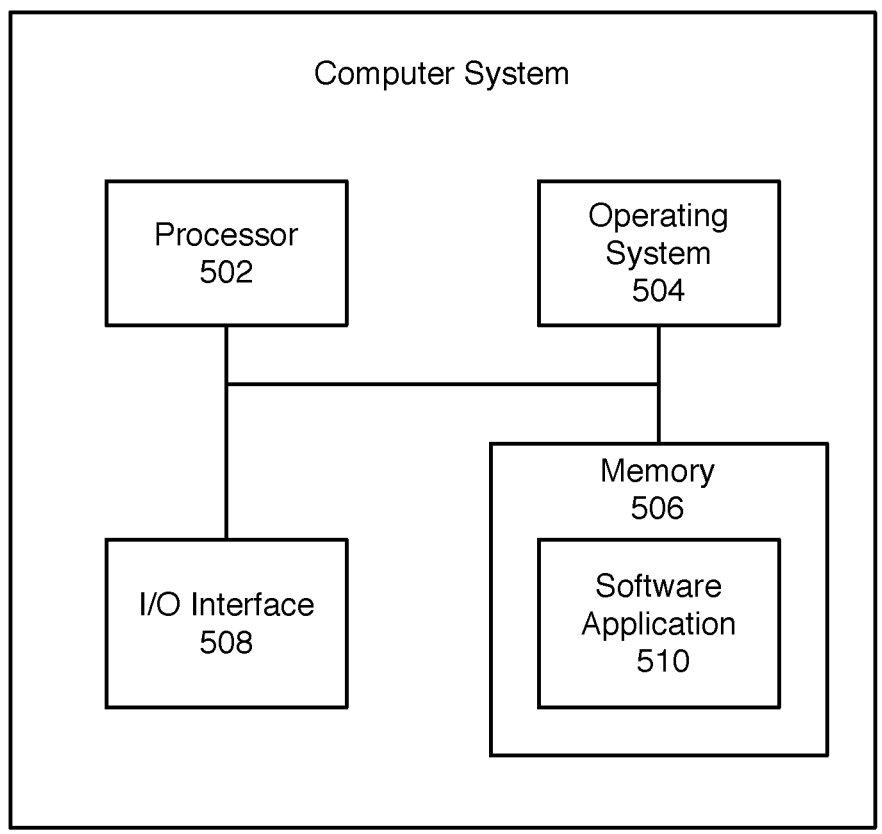
FIG. 5 is a block diagram of an example computer system, which may be used for some implementations described herein.

FIG. 5 is a block diagram of an example computer system 500, which may be used for some implementations described herein. For example, computer system 500 may be used to implement system 110 of FIG. 1, as well as to perform implementations described herein. In some implementations, computer system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computer system 500 or any suitable processor or processors associated with computer system 500 or any suitable system may perform the steps described. Implementations described herein may be carried out on a user device, on a server, or a combination of both.

Computer system 500 also includes a software application 510, which may be stored on memory 506 or on any other suitable storage location or computer-readable medium. Software application 510 provides instructions that enable processor 502 to perform the implementations described herein and other functions. Software application may also include an engine such as a network engine for performing various functions associated with one or more networks and network communications. The components of computer system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computer system 500 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
detecting activation of a screen saver that is displayed on a user interface associated with a television platform;
determining one or more messages to be displayed on the user interface in response to the detecting of the activation of the screen saver;
displaying the one or more messages on the user interface based on one or more predetermined policies, wherein the one or more messages are displayed while the user interface is in a screen saver mode, wherein the one or more messages comprise one or more announcements associated with one or more television functions of the television platform, wherein the one or more announcements provide one or more of tips associated with one or more new television features, tips associated with one or more existing television features, and information for configuring and operating the television platform, and wherein the one or more messages comprise an announcement of a new feature of an operating system after an update; and
removing the one or more messages from the user interface based on the one or more predetermined policies.

2. The system of claim 1, wherein the logic when executed is further operable to cause the one or more processors to perform operations comprising:
setting one or more flags based on one or more corresponding image conditions, wherein the one or more corresponding image conditions comprise one or more of detection of no signal, detection of a screen saver, and detection of a frozen screen; and
tracking the image conditions, wherein the tracking is performed over a predetermined time period.

3. The system of claim 1, wherein the one or more messages comprises an advertisement for at least one of a service or a show.

4. The system of claim 1, wherein the one or more messages comprise one or more of text, audio, and video.

5. The system of claim 1, wherein at least one predetermined policy of the one or more predetermined policies comprises displaying the one or more messages for a predetermined time period.

6. The system of claim 1, wherein at least one predetermined policy of the one or more predetermined policies comprises removing the one or more messages in response to the screen saver being deactivated.

7. The system of claim 1, wherein at least one predetermined policy of the one or more predetermined policies comprises removing the one or more messages in response to a selection of a remote control button associated with the television platform.

8. A non-transitory computer-readable storage medium with program instructions stored thereon, the program instructions when executed by one or more processors are operable to cause the one or more processors to perform operations comprising:
detecting activation of a screen saver that is displayed on a user interface associated with a television platform;
determining one or more messages to be displayed on the user interface in response to the detecting of the activation of the screen saver;
displaying the one or more messages on the user interface based on one or more predetermined policies, wherein the one or more messages are displayed while the user interface is in a screen saver mode, wherein the one or more messages comprise one or more announcements associated with one or more television functions of the television platform, wherein the one or more announcements provide one or more of tips associated with one or more new television features, tips associated with one or more existing television features, and information for configuring and operating the television platform, and wherein the one or more messages comprise an announcement of a new feature of an operating system after an update; and removing the one or more messages from the user interface based on the one or more predetermined policies.

9. The computer-readable storage medium of claim 8, wherein the one or more messages comprise an announcement of one of a new feature or information for an existing feature.

10. The computer-readable storage medium of claim 8, wherein the one or more messages comprises an advertisement for at least one of a service or a show.

11. The computer-readable storage medium of claim 8, wherein the one or more messages comprise one or more of text, audio, and video.

12. The computer-readable storage medium of claim 8, wherein at least one predetermined policy of the one or more predetermined policies comprises displaying the one or more messages for a predetermined time period.

13. The computer-readable storage medium of claim 8, wherein at least one predetermined policy of the one or more predetermined policies comprises removing the one or more messages in response to the screen saver being deactivated.

14. The computer-readable storage medium of claim 8, wherein at least one predetermined policy of the one or more predetermined policies comprises removing the one or more messages in response to a selection of a remote control button associated with the television platform.

15. A computer-implemented method comprising:
   detecting activation of a screen saver that is displayed on a user interface associated with a television platform;
   determining one or more messages to be displayed on the user interface in response to the detecting of the activation of the screen saver;
   displaying the one or more messages on the user interface based on one or more predetermined policies, wherein the one or more messages are displayed while the user interface is in a screen saver mode, wherein the one or more messages comprise one or more announcements associated with one or more television functions of the television platform, wherein the one or more announcements provide one or more of tips associated with one or more new television features, tips associated with one or more existing television features, and information for configuring and operating the television platform, and wherein the one or more messages comprise an announcement of a new feature of an operating system after an update; and
   removing the one or more messages from the user interface based on the one or more predetermined policies.

16. The method of claim 15, wherein the one or more messages comprise an announcement of one of a new feature or information for an existing feature.

17. The method of claim 15, wherein the one or more messages comprises an advertisement for at least one of a service or a show.

18. The method of claim 15, wherein the one or more messages comprise one or more of text, audio, and video.

19. The method of claim 15, wherein at least one predetermined policy of the one or more predetermined policies comprises displaying the one or more messages for a predetermined time period.

20. The method of claim 15, wherein at least one predetermined policy of the one or more predetermined policies comprises removing the one or more messages in response to the screen saver being deactivated.

* * * * *